United States Patent
Yin et al.

(10) Patent No.: US 10,773,907 B2
(45) Date of Patent: Sep. 15, 2020

(54) METHOD FOR OPERATING MULTI-BAR LINKAGE MECHANISM BASED CONVEYOR

(71) Applicant: Changsha University of Science and Technology, Changsha, Hunan (CN)

(72) Inventors: Lairong Yin, Hunan (CN); Juan Huang, Hunan (CN); Shuo Cai, Hunan (CN); Peng Xu, Hunan (CN); Lin Hu, Hunan (CN); Xuejun Peng, Hunan (CN); Anwei Jiang, Hunan (CN)

(73) Assignee: Changsha University of Science and Technology, Changsha (CN)

( * ) Notice: Subject to any disclaimer, the term of this patent is extended or adjusted under 35 U.S.C. 154(b) by 0 days.

(21) Appl. No.: 16/578,158

(22) Filed: Sep. 20, 2019

(65) Prior Publication Data
US 2020/0010289 A1 Jan. 9, 2020

Related U.S. Application Data

(63) Continuation of application No. PCT/CN2019/079665, filed on Mar. 26, 2019.

(30) Foreign Application Priority Data

Mar. 30, 2018 (CN) .......................... 2018 1 0275007

(51) Int. Cl.
*B65G 67/60* (2006.01)
*B65G 21/14* (2006.01)

(52) U.S. Cl.
CPC ............ *B65G 67/60* (2013.01); *B65G 21/14* (2013.01); *B65G 67/606* (2013.01); *B65G 2814/0397* (2013.01)

(58) Field of Classification Search
CPC ...... B65G 21/14; B65G 21/12; B65G 41/001; B65G 41/002; B65G 41/003;
(Continued)

(56) References Cited

U.S. PATENT DOCUMENTS 2,576,217 A * 11/1951 Smith ................... B65G 21/14
198/313
2,678,125 A * 5/1954 Bonney, Jr. ........... B65G 21/14
198/812
(Continued)

FOREIGN PATENT DOCUMENTS

AU         4997685 A      5/1986
CN      203558592 U      4/2014
(Continued)

*Primary Examiner* — Mark A Deuble
(74) *Attorney, Agent, or Firm* — Wayne & Ken, LLC; Tony Hom

(57) ABSTRACT

The present invention discloses a method for operating a multi-bar linkage mechanism based conveyor. Stretching the mechanism based conveyor comprises: an automatic control system is started to control a first two-drum winch, a second two-drum winch, and hydraulic cylinders in a multi-bar linkage mechanism based conveyor boom to operate together until the mechanism enters an operating state, and the first two-drum winch, the second two-drum winch, and the hydraulic cylinders in the multi-bar linkage mechanism based conveyor boom stop operating. Then, the angle of the multi-bar linkage mechanism based conveyor boom can be adjusted by controlling the operation of the second two-drum winch. Retracting the mechanism based conveyor comprises: the automatic control system is started to control the first two-drum winch, the second two-drum winch, and the hydraulic cylinders in the multi-bar linkage mechanism based conveyor boom to operate together until the mechanism enters a non-operating state.

7 Claims, 2 Drawing Sheets

(58) Field of Classification Search
CPC .. B65G 69/2823; B65G 67/60; B65G 67/606; B65G 2814/0397; B65G 2203/0283; B65G 69/2847; B65G 2203/042; B65G 2207/40; B63B 27/22; E01D 15/24; B60P 1/43
USPC ........................................................ 198/812
See application file for complete search history.

(56) References Cited

U.S. PATENT DOCUMENTS

| | | | | | |
|---|---|---|---|---|---|
| 3,294,216 | A | * | 12/1966 | Lawrence | B65G 21/14 198/812 |
| 4,860,787 | A | * | 8/1989 | Grosselin | B41J 2/175 137/487.5 |
| 5,181,600 | A | * | 1/1993 | Chappell | B65G 21/06 198/309 |
| 5,632,371 | A | | 5/1997 | Best et al. | |
| 5,636,728 | A | | 6/1997 | Best et al. | |
| 5,850,903 | A | * | 12/1998 | Walters | B65G 21/14 198/588 |
| 6,095,320 | A | * | 8/2000 | DeMong | B65G 15/00 198/812 |
| 2010/0018835 | A1 | * | 1/2010 | Kinnunen | B65G 21/14 198/313 |

FOREIGN PATENT DOCUMENTS

| | | |
|---|---|---|
| CN | 103964130 A | 8/2014 |
| CN | 204057314 U | 12/2014 |
| CN | 104986510 A | 10/2015 |
| CN | 204714119 U | 10/2015 |
| CN | 204751558 U | 11/2015 |
| CN | 106144423 A | 11/2016 |
| CN | 106144424 A | 11/2016 |
| CN | 106477341 A | 3/2017 |
| CN | 106743280 A | 5/2017 |
| CN | 108455318 A | 8/2018 |
| CN | 108455319 A | 8/2018 |

* cited by examiner

METHOD FOR OPERATING MULTI-BAR LINKAGE MECHANISM BASED CONVEYOR

CROSS-REFERENCE TO RELATED APPLICATIONS

This application is a continuation of International Patent Application No. PCT/CN2019/079665, filed on Mar. 26, 2019, which claims the benefit of priority from Chinese Patent Application No. 201810275007.2, filed on Mar. 30, 2018. The contents of the aforementioned application, including any intervening amendments thereto, are incorporated herein by reference in its entirety.

TECHNICAL FIELD

The present invention relates to the technical field of conveyors for transport ships and in particular to a method for operating a multi-bar linkage mechanism based conveyor.

BACKGROUND OF THE PRESENT INVENTION

In recent years, inland sand unloading vessels have attracted widespread attention due to their advantages of flexible and quick cargo unloading performance. However, the instability of such vessels also has become increasingly prominent. Furthermore, due to large water coverage and rich waterway resources in China, inland sand unloading vessels have been widely applied and this industry is booming. However, the conveyor boom of a conventional self-unloading vessel may have a length up to 40 m, but it cannot be retracted, resulting in low stability and high safety hazard. For example, since accidents frequently occur in the conventional overhung belt racks, the insurance for belt racks had been refused by insurance companies in China.

Therefore, to solve the technical difficulty in retracting conveyor booms, many solutions have been proposed in China, such as stretchable and retractable conveyor booms, rotary conveyor booms and folding conveyor booms.

The published Inventive Patent No. 201610594201.8, entitled "SELF-ADAPTIVE INTEGRALLY-OVER-TURNED CONVEYOR", provided a conveying solution in which a two-drum winch and an integral trussed boom are used and the conveyor boom is pulled by the two-drum winch to be folded. This solution solves occupation of the space of the hull to some extent; the integral overturning mode is simpler and more convenient than the folded overturning mode; and during the sand unloading, the boom is higher in safety. However, due to the use of the integral trussed boom that is fixed in length, the conveying distance is not adjustable. Although the integral overturning mode is simpler and more convenient than the folded overturning mode, the overturned conveyor arm is suspended, not firmly fixed, resulting in high safety hazard.

The published Inventive Patent No. 201610728114.7, entitled "CONVEYOR WITH STRETCHABLE AND RETRACTABLE CONVEYOR ARM", provided a solution in which a multi-stage hydraulic cylinder and a scissor fork mechanism are used, and the retraction of the scissor fork mechanism is realized by the multi-stage hydraulic cylinder to thus make the conveyor arm stretchable and retractable. This solution realizes, to some extent, small influence to the balance of the hull by the stretch and retraction of the conveyor arm, large stretchable distance, high stretch and retraction efficiency, stable operation, and high safety. In contrast, compared with the scissor fork mechanism, the multi-bar linkage mechanism is more stable in operation, larger in the stretchable distance, and safer than the multi-stage hydraulic cylinder because the conveyor boom is unfolded in a unit of multi-bar linkage mechanisms; no tensioning mechanism is required; and it is more convenient for production and assembly.

SUMMARY OF THE PRESENT INVENTION

An objective of the present invention is to provide a method for operating a multi-bar linkage mechanism based conveyor, to solve problems of self-unloading vessels such as large footprint in an out-of-service state and complex retraction operation, and problems in the prior art such as complex gantry structure, overweight conveyor boom, insufficient length of the conveyor arm, complex mounting and debugging, lack of automatic control, lack of safety guard device, etc., in order to reduce the manufacture and maintenance cost and improve the automation and safety.

To solve those technical problems, the present invention provides a method for operating a multi-bar linkage mechanism based conveyor, comprising a gantry system (1), a multi-bar linkage mechanism based conveyor boom (2), a boom support (3), a first two-drum winch (4), a roller unit (5), a second two-drum winch (6), an automatic control system and a hull (7), wherein the gantry system (1) comprises a gantry, a set of gantry pulleys and a gantry support. The multi-bar linkage mechanism based conveyor boom 2 comprises multi-bar linkage mechanisms 201, hydraulic cylinders 202 and pulleys 203, and is in a composite structure of carbon fibers and carbon steel. The multi-bar linkage mechanism based conveyor boom 2 is articulated with the boom support 3. The multi-bar linkage mechanism based conveyor boom 2 comprises a plurality of multi-bar linkage mechanisms 201 each having a set of pulleys 203, and each two adjacent multi-bar linkage mechanisms 201 are powered by one hydraulic cylinder 202.

The multi-bar linkage mechanism 201 comprises, on a single side, eight bars among which: a first bar 11 is fixed and the first bars 11 on two opposite sides form a boom, two ends of a second bar 12 are articulated with the first bar 11, a fifth bar 15 and a sixth bar 16, the second bar 12 is articulated with a fourth bar 14 at a position that is 43%-44% of its whole length, two ends of a third bar 13 are articulated with the first bar 11, the fourth bar 14 and a seventh bar 17, two ends of the seventh bar 17 are articulated with the third bar 13, the fourth bar 14 and an eighth bar 18, the seventh bar 17 is articulated with the fifth bar 15 at a position that is 56%-57% of its whole length, two ends of the sixth bar 16 are articulated with the second bar 12, the fifth bar 15 and the eighth bar 18, and the eighth bar 18 can move. To realize the movement of the eighth bar 18, the second bar 12 is pushed by a hydraulic cylinder 202, the fourth bar 14 is driven by the second bar 12 so that the third bar 13 moves together, and the fifth bar 15 is driven by the second bar 12 and the third bar 13 so that the seventh bar 17 and the sixth bar 16 that is directly articulated with the second bar 12 move together, and in this way, the eighth bar 180 is driven to move horizontally. The movement of the eighth bar is an important part of the operation of the multi-bar linkage mechanism based conveyor.

The operating mode for a multi-bar linkage mechanism based conveyor comprises following modes: a hydraulically-driven mode, a winch-driven mode, a stretch and retraction adjustment mode, a bearing adjustment mode and a counterweight adjustment mode;

in the hydraulically-driven mode, the hydraulic cylinder 202 comprises a cylinder and a piston, and the piston is forced to lift up by pressurizing the cylinder, to drive the second bar to rotate, thus to control the movement of the multi-bar linkage mechanism containing the second bar; in each two adjacent multi-bar linkage mechanisms 201, the sixth bar of a multi-bar linkage mechanism 201 with a hydraulic cylinder 202 is connected to the second bar 12 of a multi-bar linkage mechanism 201 without a hydraulic cylinder 202 to transfer power; in the hydraulically-driven mode, when it is necessary to stretch the multi-bar linkage mechanisms 201, all the multi-bar linkage mechanisms 201 are stretched, and when it is necessary to retract the multi-bar linkage mechanisms 201, all the multi-bar linkage mechanisms 201 are retracted; and in this way, the multi-bar linkage mechanism based conveyor boom 2 can be stretched horizontally;

the first two-drum winch 4 is connected to the pulleys 203 on the multi-bar linkage mechanism based conveyor boom 2 via a steel wire rope and by a set of gantry pulleys 101 arranged on top of the gantry, a tension sensor 19 is arranged at an end of the steel wire rope, and the pulling of the whole conveyor is controlled by the automatic control system; the second two-drum winch 6 is connected to a gantry pulley 102 arranged at an upper end of the gantry via a steel wire rope, a tension sensor 19 is arranged at an end of the steel wire rope, and an angle of pulling of the whole conveyor and the stability of the gantry system 1 are controlled by the automatic control system; each multi-bar linkage mechanism 201, serving as an operating unit, of the multi-bar linkage mechanism based conveyor boom 2 can send a signal to a hydraulic cylinder 202 by the control system, so as to control the stretch distance of the multi-bar linkage mechanism based conveyor boom 2;

in the winch-driven mode, during the stretching, the first two-drum winch 4 or the second two-drum winch 6 may be controlled to move separately to play a role of driving; during the retraction, the first two-drum winch 4 and the second two-drum winch 6 may be controlled to move together to play a role of driving; during the driving, the first two-drum winch 4 drives the steel wire rope that in turn drives the pulleys 203 to move, so as to move synchronously to the multi-bar linkage mechanisms 201 and synchronously to the stretch or retraction of the multi-bar linkage mechanism based conveyor boom 2, thus to maintain the stability of the whole system;

in the stretch and retraction adjustment mode, the whole multi-bar linkage mechanism based conveyor boom 2 is divided into three segments each having a main control switch, and one of the three segments may be controlled to stretch or retract separately when it is necessary to adjust the stretch length of the multi-bar linkage mechanism based conveyor boom 2;

the roller unit 5 comprises upper bearing rollers 8 and lower return rollers 9; an upper cross-bar and a lower cross-bar are mounted on the first bar 11 of each multi-bar linkage mechanism 201, an upper mounting rack is arranged above the upper cross-bar and on an inner side of the first bar, a first upper bearing roller, a second upper bearing roller and a third upper bearing roller which are connected to each other are arranged at an inside upper end of the upper mounting rack, and the first and third upper bearing rollers are arranged obliquely; a connection handle 901 is connected above two ends of the lower cross-bar, the connection handle 901 can rotate relatively to the lower cross-bar, and the lower return rollers are arranged on the connection handle 901; a carrier is arranged on the first bar 11 at a position above the upper cross-bar, the hydraulic cylinder 202 is arranged above the carrier, and the second bar 12 is connected above the piston; the pulley 203 is also connected above the second bar 12, the pulley 203 comprises a pulley sheave 231 and a connecting rod 232 by which the pulley sheave 231 is connected above the second bar 12;

a space is reserved above the first bar 11, the pulley 203 is also connected above the first bar 11, the pulley 203 comprises the pulley sheave 231 and the connecting rod 232 by which the pulley sheave 231 is connected above the first bar 11;

in the counterweight adjustment mode, a dual-purpose hole is formed in the middle of the boom support 3, which saves material in light load situations and into which reinforced columns are inserted in heavy load situations; and in the bearing adjustment mode, by adjusting the angle of the connection handle 901 and controlling the bearing position of the lower return rollers, different bearing requirements are met.

The operating steps will be described below. Stretching the conveyor comprises:

step 1: the automatic control system is started to control the first two-drum winch 4, the second two-drum winch 6, and the hydraulic cylinders 202 in the multi-bar linkage mechanism based conveyor boom 2 to operate together;

step 2: the multi-bar linkage mechanisms 201 are driven by the hydraulic cylinders 202 to stretch, so that the multi-bar linkage mechanism based conveyor boom 2 enters an operating state;

step 3: at the same time of performing the step 2, the first two-drum winch 4 drives the steel wire rope that in turn drives the pulleys 203 to move, so as to move synchronously to the multi-bar linkage mechanisms 201 and synchronously to the stretch of the multi-bar linkage mechanism based conveyor boom 2, thus to maintain the stability of the whole system; and the second two-drum winch 6 pulls the steel wire rope to keep the overall stability of the gantry and the multi-bar linkage mechanism based conveyor boom 2; and step 4: after the multi-bar linkage mechanism based conveyor boom 2 enters the operating state, by controlling the starting/stopping of the second two-drum winch 6, the multi-bar linkage mechanism based conveyor boom 2 can rotate by an angle ranging from −20° to +20° by pulling the gantry to rotate by a steel wire rope.

Retracting the conveyor comprises:

step 1: the automatic control system is started to control the first two-drum winch 4, the second two-drum winch 6, and the hydraulic cylinders 202 in the multi-bar linkage mechanism based conveyor boom 2 to operate together;

step 2: the multi-bar linkage mechanisms 201 are driven by the hydraulic cylinders 202 to retract, so that the multi-bar linkage mechanism based conveyor boom 2 enters a non-operating state;

step 3: at the same time of performing the step 2, the first two-drum winch 4 drives the steel wire rope that in turn drives the pulleys 203 to move, so as to move synchronously to the multi-bar linkage mechanisms 201 and synchronously to the retraction of the multi-bar linkage mechanism based conveyor boom 2, thus to maintain the stability of the whole system; and the second two-drum winch 6 pulls the steel wire rope to keep the overall stability of the gantry and the multi-bar linkage mechanism based conveyor boom 2; and step 4: after the multi-bar linkage mechanism based conveyor boom 2 enters the operating state, by controlling the starting/stopping of the second two-drum winch 6, the multi-bar linkage mechanism based conveyor boom 2 can return to the non-operating state in which it is horizontal to the vessel deck by pulling the gantry to rotate by a steel wire rope.

The automatic control system is connected to the tension sensor 19 arranged at an end of each steel wire rope. When tension information obtained by the tension sensor 19 indicates a risk value, the whole conveyor may be controlled by the automatic control system to stop operating. The second two-drum winch 6 is connected to a gantry pulley 102 arranged at an upper end of the gantry via a steel wire rope. A tension sensor 19 is arranged at an end of the steel wire rope. The stability of the whole gantry system 1 is determined through the tension sensor 19, to avoid the loss of stability of the whole system. Both an angle of pulling of the whole conveyor and the stability of the gantry system 1 are controlled by the automatic control system, by analyzing the information from the tension sensor 19. In this way, the automatic control and the safety monitoring are realized. The roller unit 5 comprises upper bearing rollers 8, lower return rollers 9 and reversing rollers 10. The upper bearing rollers 8 are uniformly mounted on the cross-bar on the surface of the boom. The lower return rollers 9 are mounted on the cross-bar on the bottom of the boom. The reversing rollers 10 are mounted at a forefront end of the conveyor boom 2. Automatic tensioning can be realized since the multi-bar linkage mechanisms 201 of the multi-bar linkage mechanism based conveyor boom 2 are stretched. No tensioning device is required, so that it is simpler to operate the automatic control system. The overall structure of the conveyor is more concise.

By obtaining, in real time, stressed deformation information of each multi-bar linkage mechanism 201 from the tension sensor 19 by using the automatic control system during the operation of the conveyor, the multi-bar linkage mechanism based conveyor boom 2 is controlled and monitored precisely. Accordingly, risk factors can be found in time. This can reduce the fault probability and ensure the operating efficiency of the conveyor because the operators can carry out repairs in advance. Furthermore, the whole conveyor is automatically controlled by a programmable control system.

Compared with the prior art, the method for operating a multi-bar linkage mechanism based conveyor according to the above technical solution has the following beneficial effects. The operating mode for a multi-bar linkage mechanism based conveyor comprises following modes: a hydraulically-driven mode, a winch-driven mode, a stretch and retraction adjustment mode, a bearing adjustment mode and a counterweight adjustment mode. The operating method comprising those modes that are cooperated with each other realizes higher safety and better stretch and retraction performance. Compared with the integral trussed boom and the scissor fork mechanism used in the prior art, due to the stretch and retraction adjustment mode, the multi-bar linkage mechanism based conveyor boom 2 has the following advantages: first, the stretch and retraction length is adjustable so that the applicable range is wider; second, the overall structure is simple and the structural modularization is convenient for production and assembly; third, the deformation under load is low; fourth, since a tension sensor 19 is arranged at an end of the steel wire rope, when the multi-bar linkage mechanism based conveyor boom 2 is to be retracted, automatic control can be realized by the automatic control system, thus the operating difficulty of the operators is greatly decreased, and the safety in operating the device is significantly improved; due to the counterweight adjustment mode, this operating method is more cost-effective; and due to the bearing adjustment mode, based on the excellent performance of the multi-bar linkage mechanisms 201, the operating range of the conveyor is further expanded. In the multi-bar linkage mechanism based conveyor, by changing the retraction of the multi-bar linkage mechanism based conveyor 2 to horizontal retraction, the operation is simpler and more convenient than the integral overturning mode and the folded overturning mode; and during the sand unloading, the boom is higher in safety. Furthermore, no tensioning device is required. This reduces loads on the boom. Moreover, it is easy to realize automatic adjustment of the tension and deviation of the conveyor belt, high retraction efficiency, more reliable safety factor, low maintenance and use costs, etc.

BRIEF DESCRIPTION OF THE DRAWINGS

FIG. 4 is a schematic view of a multi-bar linkage mechanism based conveyor, in the retracted state, in which:

Figure 1:
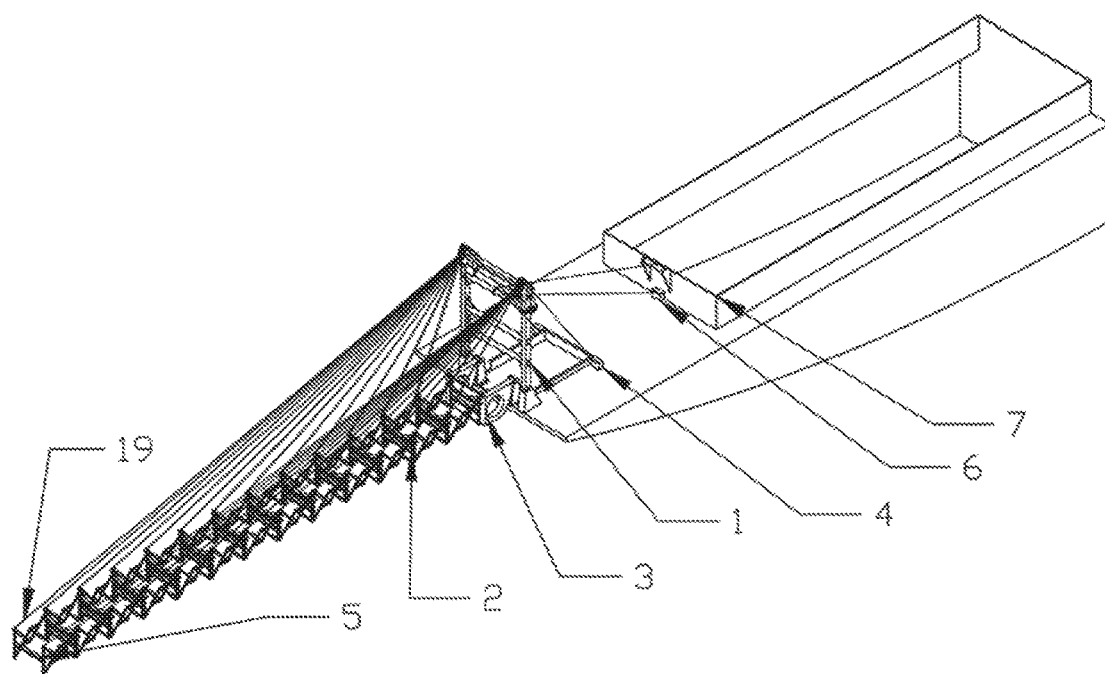
FIG. 1 is a schematic view of a multi-bar linkage mechanism based conveyor, in the operating state.
Figure 2:
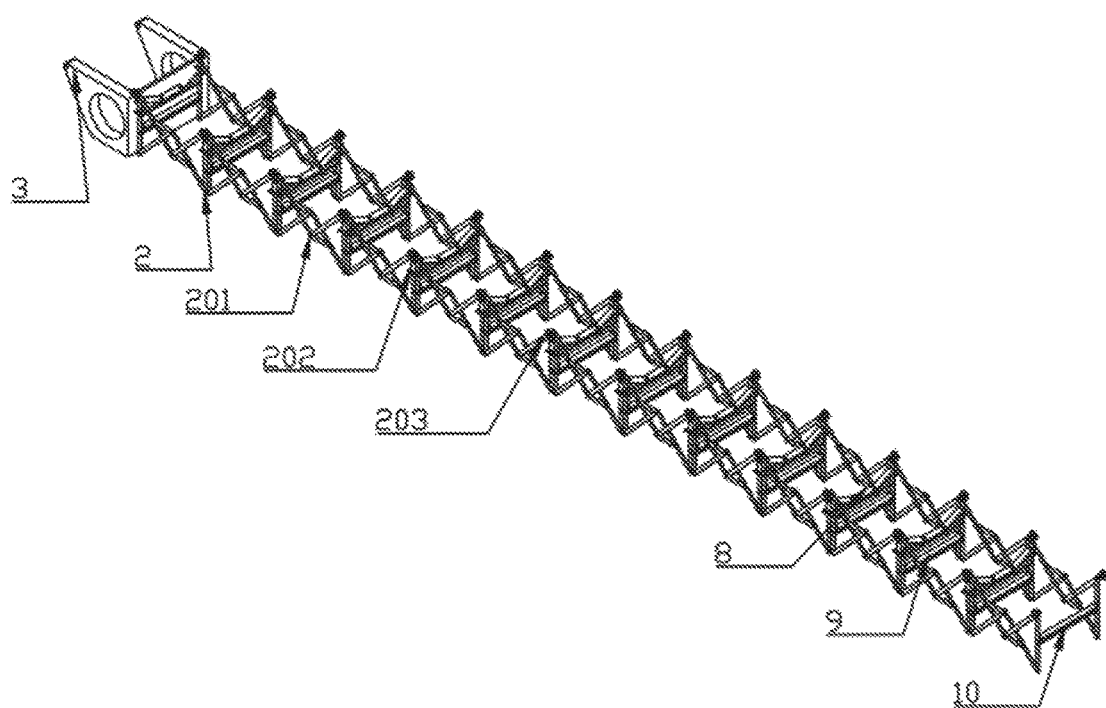
FIG. 2 is a partial structure diagram of a multi-bar linkage mechanism based conveyor boom.

1: gantry system;
101: gantry pulley arranged on top of the gantry;
102: gantry pulley arranged at an upper end of the gantry
2: multi-bar linkage mechanism based conveyor boom;
201: multi-bar linkage mechanism;
202: hydraulic cylinder;
203: pulley;
231: pulley sheave;
232: connecting rod;
3: boom support;
4: first two-drum winch;
5: roller unit;
6: second two-drum winch;
7: hull;
8: upper bearing roller;
9: lower return roller;
901: connection handle;
10: reversing roller;
11: first bar;
12: second bar;
13: third bar;
14: fourth bar;
15: fifth bar;
16: sixth bar;
17: seventh bar;
18: eighth bar; and
19: tension sensor.

DETAILED DESCRIPTION OF THE PRESENT INVENTION

The present invention will be further described below with reference to the accompanying drawings by specific embodiments.

An embodiment of the present invention will be described below. A method for operating a multi-bar linkage mechanism based conveyor is provided. The conveyor comprises a gantry system 1, a gantry, a set of gantry pulleys, gantry pulleys, a gantry support, a multi-bar linkage mechanism based conveyor boom 2, a boom support 3, a first two-drum winch 4, a roller unit 5, a second two-drum winch 6 and an automatic control system. The multi-bar linkage mechanism based conveyor boom 2 comprises multi-bar linkage mechanisms 201, hydraulic cylinders 202 and pulleys 203, wherein the pulleys 203 are in a composite structure of carbon fibers and carbon steel. The multi-bar linkage mechanism based conveyor boom 2 is articulated with the boom support 3. The multi-bar linkage mechanism based conveyor boom 2 comprises a plurality of multi-bar linkage mechanisms 201 each having a set of pulleys 203, and each two adjacent multi-bar linkage mechanisms 201 are powered by one hydraulic cylinder 202.

Figure 3:
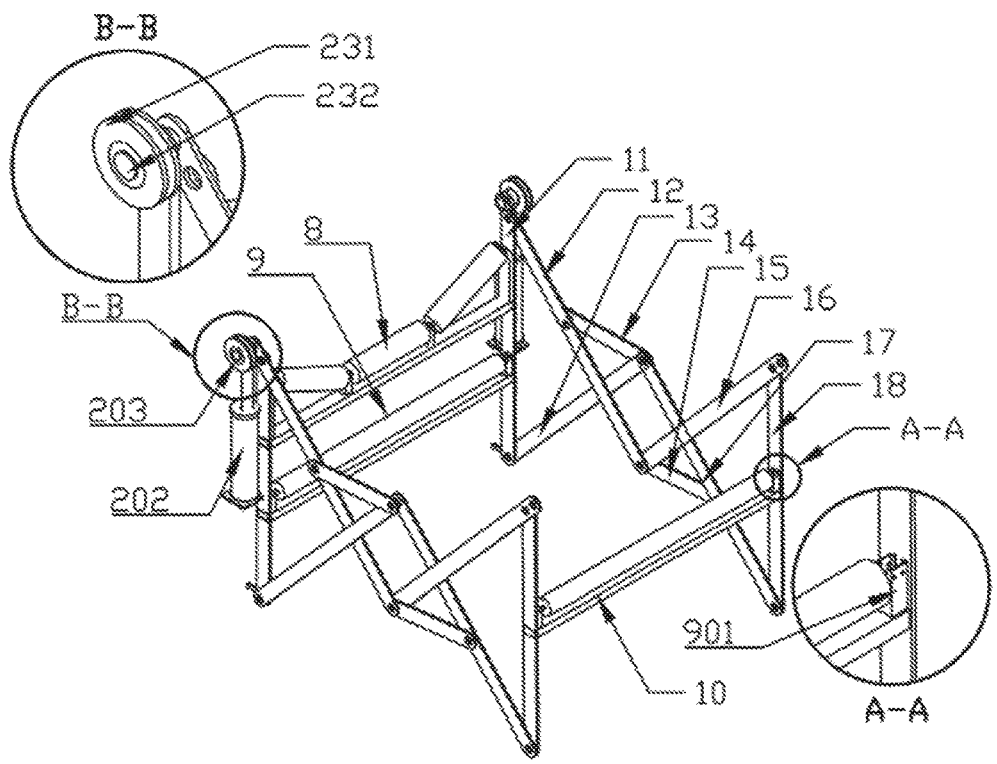
FIG. 3 is a structure diagram of a multi-bar linkage mechanism.

FIG. 3 is a structure diagram of a multi-bar linkage mechanism. The multi-bar linkage mechanism 201 comprises, on a single side, eight bars among which: a first bar 11 is fixed and the first bars 11 on two opposite sides form a boom, two ends of a second bar 12 are articulated with the first bar 11, a fifth bar 15 and a sixth bar 16, the second bar 12 is articulated with a fourth bar 14 at a position that is 43%-44% of its whole length, two ends of a third bar 13 are articulated with the first bar 11, the fourth bar 14 and a seventh bar 17, two ends of the seventh bar 17 are articulated with the third bar 13, the fourth bar 14 and an eighth bar 18, the seventh bar 17 is articulated with the fifth bar 15 at a position that is 56%-57% of its whole length, two ends of the sixth bar 16 are articulated with the second bar 12, the fifth bar 15 and the eighth bar 18, and the eighth bar 18 can move. To realize the movement of the eighth bar 18, the second bar 12 is pushed by a hydraulic cylinder 202, the fourth bar 14 is driven by the second bar 12 so that the third bar 13 moves together, and the fifth bar 15 is driven by the second bar 12 and the third bar 13 so that the seventh bar 17 and the sixth bar 16 that is directly articulated with the second bar 12 move together, and in this way, the eighth bar 180 is driven to move horizontally. The movement of the eighth bar is an important part of the operation of the multi-bar linkage mechanism based conveyor.

FIG. 1 is a schematic view of a multi-bar linkage mechanism based conveyor, in the operating state, also showing the stretched state of the multi-bar linkage mechanism based conveyor boom 2. The operating steps of the multi-bar linkage mechanism based conveyor will be described below. Stretching the conveyor comprises:

step 1: the automatic control system is started to control the first two-drum winch 4, the second two-drum winch 6, and the hydraulic cylinders 202 in the multi-bar linkage mechanism based conveyor boom 2 to operate together;

step 2: the multi-bar linkage mechanisms 201 are driven by the hydraulic cylinders 202 to stretch, so that the multi-bar linkage mechanism based conveyor boom 2 enters an operating state;

step 3: at the same time of performing the step 2, the first two-drum winch 4 drives the steel wire rope that in turn drives the pulleys 203 to move, so as to move synchronously to the multi-bar linkage mechanisms 201 and synchronously to the stretch of the multi-bar linkage mechanism based conveyor boom 2, thus to maintain the stability of the whole system; and the second two-drum winch 6 pulls the steel wire rope to keep the overall stability of the gantry and the multi-bar linkage mechanism based conveyor boom 2; and step 4: after the multi-bar linkage mechanism based conveyor boom 2 enters the operating state, by controlling the starting/stopping of the second two-drum winch 6, the multi-bar linkage mechanism based conveyor boom 2 can rotate by an angle ranging from −20° to +20° by pulling the gantry to rotate by a steel wire rope.

Figure 4:
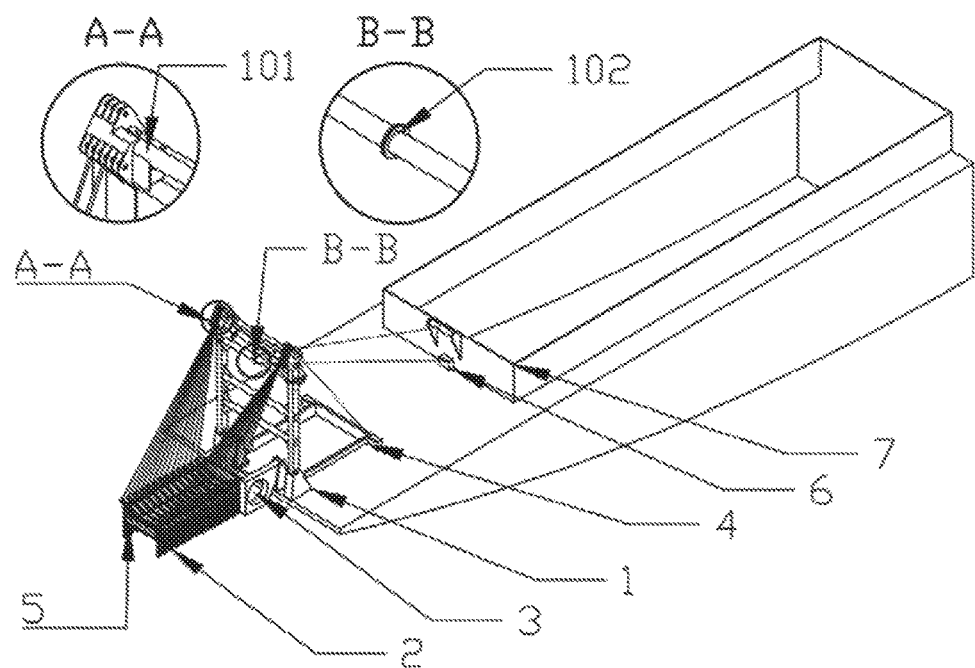

FIG. 4 is a schematic view of a multi-bar linkage mechanism based conveyor, in the retracted state. Retracting the conveyor comprises:

step 1: the automatic control system is started to control the first two-drum winch 4, the second two-drum winch 6, and the hydraulic cylinders 202 in the multi-bar linkage mechanism based conveyor boom 2 to operate together;

step 2: the multi-bar linkage mechanisms 201 are driven by the hydraulic cylinders 202 to retract, so that the multi-bar linkage mechanism based conveyor boom 2 enters a non-operating state;

step 3: at the same time of performing the step 2, the first two-drum winch 4 drives the steel wire rope that in turn drives the pulleys 203 to move, so as to move synchronously to the multi-bar linkage mechanisms 201 and synchronously to the retraction of the multi-bar linkage mechanism based conveyor boom 2, thus to maintain the stability of the whole system; and the second two-drum winch 6 pulls the steel wire rope to keep the overall stability of the gantry and the multi-bar linkage mechanism based conveyor boom 2; and step 4: after the multi-bar linkage mechanism based conveyor boom 2 enters the operating state, by controlling the starting/stopping of the second two-drum winch 6, the multi-bar linkage mechanism based conveyor boom 2 can return to the non-operating state in which it is horizontal to the vessel deck by pulling the gantry to rotate by a steel wire rope.

The automatic control system is connected to the tension sensor 19 arranged at an end of each steel wire rope. When tension information obtained by the tension sensor 19 indicates a risk value, the whole conveyor may be controlled by the automatic control system to stop operating. The second two-drum winch 6 is connected to a gantry pulley 102 arranged at an upper end of the gantry via a steel wire rope. A tension sensor 19 is arranged at an end of the steel wire rope. The stability of the whole gantry system 1 is determined through the tension sensor 19, to avoid the loss of stability of the whole system. Both an angle of pulling of the whole conveyor and the stability of the gantry system 1 are controlled by the automatic control system, by analyzing the information from the tension sensor 19. In this way, the automatic control and the safety monitoring are realized. The roller unit 5 comprises upper bearing rollers 8, lower return rollers 9 and reversing rollers 10. The upper bearing rollers 8 are uniformly mounted on the cross-bar on the surface of the boom. The lower return rollers 9 are mounted on the cross-bar on the bottom of the boom. The reversing rollers 10 are mounted at a forefront end of the conveyor boom 2. Automatic tensioning can be realized since the multi-bar linkage mechanisms 201 of the multi-bar linkage mechanism based conveyor boom 2 are stretched. No tensioning device is required, so that it is simpler to operate the automatic control system. The overall structure of the conveyor is more concise.

By obtaining, in real time, stressed deformation information of each multi-bar linkage mechanism 201 from the tension sensor 19 by using the automatic control system during the operation of the conveyor, the multi-bar linkage mechanism based conveyor boom 2 is controlled and monitored precisely. Accordingly, risk factors can be found in time. This can reduce the fault probability and ensure the operating efficiency of the conveyor because the operators can carry out repairs in advance. Furthermore, the whole conveyor is automatically controlled by a programmable control system.

The present invention is not limited to the above implementations. Various other products may be obtained under the teaching of the present invention. Any variations in shape or structure of such products shall be within the protection scope of the present invention as long as they have the same or similar technical solutions of the present application.

What is claimed is:

1. A method for operating a multi-bar linkage mechanism based conveyor, comprising a gantry system (1), a multi-bar linkage mechanism based conveyor boom (2), a boom support (3), a first two-drum winch (4), a roller unit (5), a second two-drum winch (6), an automatic control system and a hull (7), wherein the gantry system (1) comprises a gantry, a set of gantry pulleys and a gantry support;

wherein the multi-bar linkage mechanism based conveyor boom (2) comprises multi-bar linkage mechanisms (201), hydraulic cylinders (202) and pulleys (203), and is in a composite structure of carbon fibers and carbon steel; the multi-bar linkage mechanism based conveyor boom (2) is articulated with the boom support (3), the multi-bar linkage mechanism based conveyor boom (2) comprises a plurality of multi-bar linkage mechanisms (201) each having a set of pulleys (203), and each two adjacent multi-bar linkage mechanisms (201) are powered by one hydraulic cylinder (202); the operating mode comprises following modes: a hydraulically-driven mode, a winch-driven mode, a stretch and retraction adjustment mode, a bearing adjustment mode and a counterweight adjustment mode; the multi-bar linkage mechanism (201) comprises, on a single side, eight bars among which: a first bar (11) is fixed and the first bars (11) on two opposite sides form a boom, two ends of a second bar (12) are articulated with the first bar (11), a fifth bar (15) and a sixth bar (16), the second bar (12) is articulated with a fourth bar (14) at a position that is 43%-44% of its whole length, two ends of a third bar (13) are articulated with the first bar (11), the fourth bar (14) and a seventh bar (17), two ends of the seventh bar (17) are articulated with the third bar (13), the fourth bar (14) and an eighth bar (18), the seventh bar (17) is articulated with the fifth bar (15) at a position that is 56%-57% of its whole length, two ends of the sixth bar (16) are articulated with the second bar (12), the fifth bar (15) and the eighth bar (18), and the eighth bar (18) can move; to realize the movement of the eighth bar (18), the second bar (12) is pushed by a hydraulic cylinder (202), the fourth bar (14) is driven by the second bar (12) so that the third bar (13) moves together, and the fifth bar (15) is driven by the second bar (12) and the third bar (13) so that the seventh bar (17) and the sixth bar (16) that is directly articulated with the second bar (12) move together, and in this way, the eighth bar (180) is driven to move horizontally; in the hydraulically-driven mode, the hydraulic cylinder (202) comprises a cylinder and a piston, and the piston is forced to lift up by pressurizing the cylinder, to drive the second bar (12) to rotate, thus to control the movement of the multi-bar linkage mechanism (201) containing the second bar; in each two adjacent multi-bar linkage mechanisms (201), the second bar (12) of a multi-bar linkage mechanism with a hydraulic cylinder (202) is connected to the sixth bar (16) of a multi-bar linkage mechanism (201) without a hydraulic cylinder (202) to transfer power; in the hydraulically-driven mode, when it is necessary to stretch the multi-bar linkage mechanisms (201), all the multi-bar linkage mechanisms (201) are stretched, and when it is necessary to retract the multi-bar linkage mechanisms (201), all the multi-bar linkage mechanisms (201) are retracted; the first two-drum winch (4) is connected to a set of gantry pulleys (101) arranged on top of the gantry via a steel wire rope to be connected to the pulleys (203) on the multi-bar linkage mechanism based conveyor boom (2), a tension sensor (19) is arranged at an end of the steel wire rope, and the pulling of the whole conveyor is controlled by the automatic control system; the second two-drum winch (6) is connected to a set of gantry pulleys (102) arranged at an upper end of the gantry via a steel wire rope, a tension sensor (19) is arranged at an end of the steel wire rope, and an angle of pulling of the whole conveyor and the stability of the gantry system (1) are controlled by the automatic control system; each multi-bar linkage mechanism (201), serving as an operating unit, of the multi-bar linkage mechanism based conveyor boom (2) can send a signal to a hydraulic cylinder (202) by the control system, so as to control the stretch distance of the multi-bar linkage mechanism based conveyor boom (2); in the winch-driven mode, in light load situations, the first two-drum winch (4) or the second two-drum winch (6) may be controlled to move separately to play a role of driving, and in heavy load situations, the first two-drum winch (4) and the second two-drum winch (6) may be controlled to move together to play a role of driving; during the driving, the winch drives the steel wire rope that in turn drives the pulleys to move, so as to move synchronously to the multi-bar linkage mechanisms; in the stretch and retraction adjustment mode, the whole multi-bar linkage mechanism based conveyor boom (2) is divided into three segments each having a main control switch, and one of the three segments may be controlled to stretch or retract separately when it is necessary to adjust the stretch length of the multi-bar linkage mechanism based conveyor boom (2);

the roller unit (5) comprises upper bearing rollers (8) and lower return rollers (9); an upper cross-bar and a lower cross-bar are mounted on the first bar of each multi-bar linkage mechanism (201), an upper mounting rack is arranged above the upper cross-bar and on an inner side of the first bar, a first upper bearing roller, a second upper bearing roller and a third upper bearing roller which are connected to each other are arranged at an inside upper end of the upper mounting rack, and the first and third upper bearing rollers are arranged obliquely; a connection handle (901) is connected above two ends of the lower cross-bar, the connection handle (901) can rotate relatively to the lower cross-bar, and the lower return rollers are arranged on the connection handle (901); a carrier is arranged on the first bar at a position above the upper cross-bar, the hydraulic cylinder (202) is arranged above the carrier, and the second bar (12) is connected above the piston; the pulley (203) is also connected above the second bar (12), the pulley (203) comprises a pulley sheave (231) and a connecting rod (232) by which the pulley sheave (231) is connected above the second bar (12); in the counterweight adjustment mode, a dual-purpose hole is formed in the middle of the boom support (3), which saves material in light load situations and into which reinforced columns are inserted in heavy load situations; and in the bearing adjustment mode, by adjusting the angle of the connection handle (901) and controlling the bearing position of the lower return rollers, different bearing requirements are met.

2. The method for operating a multi-bar linkage mechanism based conveyor according to claim 1, wherein the set of gantry pulleys corresponding to the gantry system (1) comprises a set of front pulleys that are connected to the pulleys (203) on the multi-bar linkage mechanism based conveyor boom (2) via a steel wire rope, and a set of rear pulleys that are connected to the first two-drum winch (4) via a steel wire rope; and the gantry is connected to the multi-bar linkage mechanism based conveyor boom (2) via a steel wire rope, and the gantry and the multi-bar linkage mechanism based conveyor boom (2) together form a stable and substantially triangular structure, and the gantry is articulated to a gantry support and is able to rotate around the gantry support by a certain angle.

3. The method for operating a multi-bar linkage mechanism based conveyor according to claim 1, wherein the multi-bar linkage mechanism based conveyor boom (2) is articulated with the boom support (3); the gantry system (1), the boom support (3), the first two-drum winch (4) and the second two-drum winch (6) are all mounted on a deck of a hull (7); and, by the second two-drum winch (6), the multi-bar linkage mechanism based conveyor boom (2) can rotate by an angle ranging from −20° to +20° by pulling the gantry to rotate by a steel wire rope.

4. The method for operating a multi-bar linkage mechanism based conveyor according to claim 2, wherein the multi-bar linkage mechanism based conveyor boom (2) is articulated with the boom support (3); the gantry system (1), the boom support (3), the first two-drum winch (4) and the second two-drum winch (6) are all mounted on a deck of a hull (7); and, by the second two-drum winch (6), the multi-bar linkage mechanism based conveyor boom (2) can rotate by an angle ranging from −20° to +20° by pulling the gantry to rotate by a steel wire rope.

5. The method for operating a multi-bar linkage mechanism based conveyor according to claim 1, wherein, in the gantry system (1), the steel wire ropes separately connected to the first two-drum winch (4) and the second two-drum winch (6) are each equipped with a tension sensor (19), information from a respective tension sensor (19) is transmitted to the automatic control system by the stretch distance of the multi-bar linkage mechanism based conveyor boom (2), and then the starting/stopping of the first two-drum winch (4), the second two-drum winch (6) and the hydraulic cylinder (202) is controlled by the automatic control system according to the safety range of this tension.

6. The method for operating a multi-bar linkage mechanism based conveyor according to claim 1, wherein the roller unit (5) further comprises reversing rollers (10) that are mounted at a forefront end of the multi-bar linkage mechanism based conveyor boom (2), and automatic tensioning can be realized since the multi-bar linkage mechanisms (201) of the multi-bar linkage mechanism based conveyor boom (2) are stretched.

7. The method for operating a multi-bar linkage mechanism based conveyor according to claim 1, wherein each multi-bar linkage mechanism (201) of the multi-bar linkage mechanism based conveyor boom (2) is connected by a bolt, and the conveyor is automatically controlled by a programmable control system.

* * * * *